United States Patent [19]
Amrany et al.

[11] Patent Number: 5,088,057
[45] Date of Patent: Feb. 11, 1992

[54] RATIONAL RATE FREQUENCY GENERATOR

[75] Inventors: Daniel Amrany, Wayside; Cecil W. Farrow, Highlands, both of N.J.

[73] Assignee: AT&T Bell Laboratories, Murray Hill, N.J.

[21] Appl. No.: 504,812

[22] Filed: Apr. 5, 1990

[51] Int. Cl.$^5$ ............................................ H03K 21/00
[52] U.S. Cl. ...................................... 364/703; 377/48
[58] Field of Search ......................... 364/703; 377/48

[56] References Cited

U.S. PATENT DOCUMENTS

| | | | |
|---|---|---|---|
| 4,078,203 | 3/1978 | Borst ................................... | 364/703 |
| 4,241,408 | 12/1980 | Gross .................................. | 364/703 |
| 4,837,721 | 6/1989 | Carmichael et al. ............... | 364/703 |
| 4,991,188 | 2/1991 | Perkins ............................... | 364/703 |

OTHER PUBLICATIONS

W. M. Newman and R. F. Sproull, "Principles of Interactive Computer Graphics", 1979, 2nd Edition, McGraw-Hill Book Company, pp. 25-27.

Primary Examiner—David H. Malzahn
Attorney, Agent, or Firm—Ronald D. Slusky

[57] ABSTRACT

A rational rate generator circuit is disclosed where the output signal frequency, $f_o$, is rationally related to the input signal frequency, $f_i$, by: $f_o = f_i(P/Q)$. This rational rate generator is capable of a high-resolution output, where the resolution is only limited by the value of the integers P and Q, with $P < Q$.

2 Claims, 6 Drawing Sheets

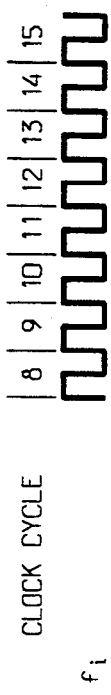
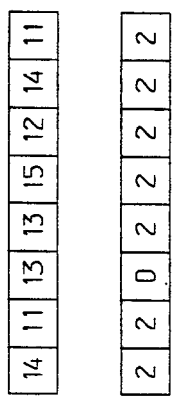
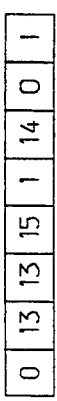
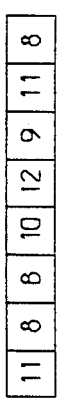
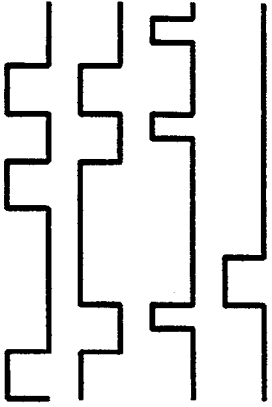
FIG. 5
CLOCK CYCLE
$f_i$
$A = H$ (FROM PREVIOUS CLOCK CYCLE)
$\hat{P}$
$B = (A+\hat{P}) \bmod 16$
$C = (B-Q) \bmod 16$
$H = \overline{E} \cdot B + E \cdot C$
E
G
$f_o$
Add
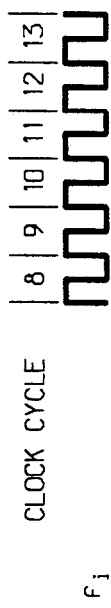
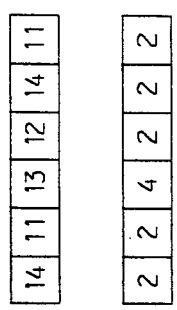
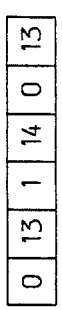
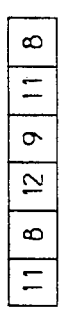
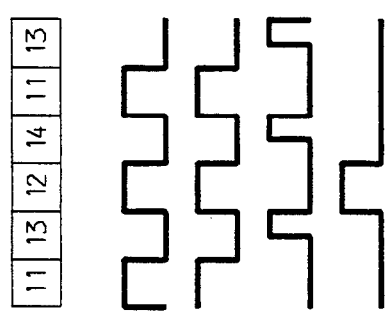
FIG. 6
CLOCK CYCLE
$f_i$
$A = H$ (FROM PREVIOUS CLOCK CYCLE)
$\hat{P}$
$B = (A+\hat{P}) \bmod 16$
$C = (B-Q) \bmod 16$
$H = \overline{E} \cdot B + E \cdot C$
E
G
$f_o$
Delete

RATIONAL RATE FREQUENCY GENERATOR

BACKGROUND OF THE INVENTION

The present invention relates to the field of frequency generators and, in particular, to the generation of signals with frequencies that are rationally related to a given input signal frequency.

Frequency generation by integral division is well-known in the art. Generally a clock source provides an input clock signal to a down counter which is configured to generate an output pulse once every N input clock pulses. As a result, the output clock signal frequency ($f_o$) is equal to the input clock signal frequency ($f_i$) divided by N (i.e., $f_o = f_i/N$), where N is an integer. However, if a range of frequencies is required, this design approach limits the range of frequencies that can be produced from a given input clock signal due to the requirement that the input clock signal be an integral multiple of the output clock signal. Further, though a signal at any particular frequency can theoretically be generated by this method, in practice the generation of high frequency output signals is limited due to the higher frequency input signal that is required (i.e., an integral multiple of the output) which may be beyond the signal frequency range of current integrated circuit technology. As a consequence, the requirement that the input clock signal be an integral multiple of the output clock signal limits the range of output frequencies and can result in circuit designs of added expense and complexity.

As a result, those in the art have taught that it is possible to utilize an input clock signal that is not restricted to being an integral multiple of the output clock signal in order to provide a higher resolution, or range, of output frequencies. In general, the prior art teaches that an output signal frequency can be rationally related to an input signal frequency by: $f_o = f_i ((P/2^m)/Q)$, where P, m, and Q are integers, and $P < 2^m < Q$, and $m > 0$. Here the prior art instructs that the input signal frequency is first multiplied by the fraction $P/2^m$, and then divided by a number Q. Nonetheless, because of the $\frac{1}{2}^m$ term, this requires that the input clock signal rate be a power-of-two higher than the output signal frequency which can still impose high frequency signal requirements on circuit design.

Those in the art have worked to remove even this restriction by teaching it is possible to fractionally produce a signal frequency by performing an integer division of the input signal frequency, i.e., $f_i/N$, and then deviating from this frequency by a fractional amount M. In particular, U.S. Pat. No. 4,837,721, issued June 6, 1989 to Carmichael et al., discloses a fractional divider where the power-of-two term is removed and the output signal frequency is related to the input signal frequency by: $f_o = f_i/(N+M)$, where N is an integer and M is equal to $\frac{1}{2}$. This approach fractionally divides the input clock signal frequency by periodically reversing the polarity of the input clock signal. However, since M is equal to $\frac{1}{2}$, the denominator can only change in discrete fractional steps, which limits the amount of frequency resolution obtained. In comparison, U.S. Pat. No. 4,241,408, issued Dec. 23, 1980 to G. Gross, discloses a fractional divider where the output signal frequency is also related to the input signal frequency by: $f_o = f_i/(N+M)$, and N is an integer, and M is a fraction equal to $L/2^K$, where L and K are integers, and $L < 2^K$. Nevertheless, though this improves the range of frequencies that are available, the output resolution is still restricted to fractional steps of $1/2^K$.

SUMMARY OF THE INVENTION

In accordance with the invention, we have discovered a technique for generating signals over a wide range of frequencies by directly multiplying the input signal frequency by a fraction P/Q (where P and Q are any integers with $P < Q$). Specifically, in order to generate an output clock signal frequency $f_o = f_i(P/Q)$ where $f_i$ is the input clock signal rate, we accumulate the sum of a number P modulo $2^M$ (where M is an integer and $Q < 2^M$) and, when this overflows, the integer Q is subtracted from the sum and a pulse is output.

In a preferred embodiment of the invention a circuit, designated a rational rate generator, is described which consists of digital building blocks such as adders and registers. As a result, the illustrative circuit design is easily extendible to allow for larger values of P and Q, and the values of P and Q can be programmable in order to provide for a selectable range of output signal frequencies.

In some applications, such as modems, timing recovery is performed and it is desirable to lock the output signal frequency to a reference signal frequency. Therefore, in accordance with a feature of the invention, an Add/Delete capability is provided to allow for additional clock phases to be added or deleted from the output signal frequency in order to lock the output signal frequency to a particular reference frequency.

BRIEF DESCRIPTION OF THE DRAWING

In the drawing,

FIG. 5 shows a timing diagram for the Add operation of the circuit of FIG. 4;

FIG. 6 shows a timing diagram for the Delete operation of the circuit of FIG. 4;

DETAILED DESCRIPTION

In accordance with the invention, we have discovered a technique for generating signals over a wide range of frequencies by directly multiplying the input signal frequency by a fraction P/Q (where P and Q are any integers with $P < Q$). Specifically, in order to generate an output clock signal frequency $f_o = f_i(P/Q)$ where $f_i$ is the input clock signal rate, we accumulate the sum of a number P modulo $2^M$ (where M is an integer and $Q < 2^M$) by repetitively adding P to itself and whenever the accumulated sum exceeds $2^M$—this occurrence being referred to as an overflow—then the quantity $2^M$ is subtracted therefrom. Additionally, whenever overflow occurs not only is $2^M$ subtracted, as just discussed, but also a number Q is subtracted from the sum and a clock pulse is output.

Figure 1:
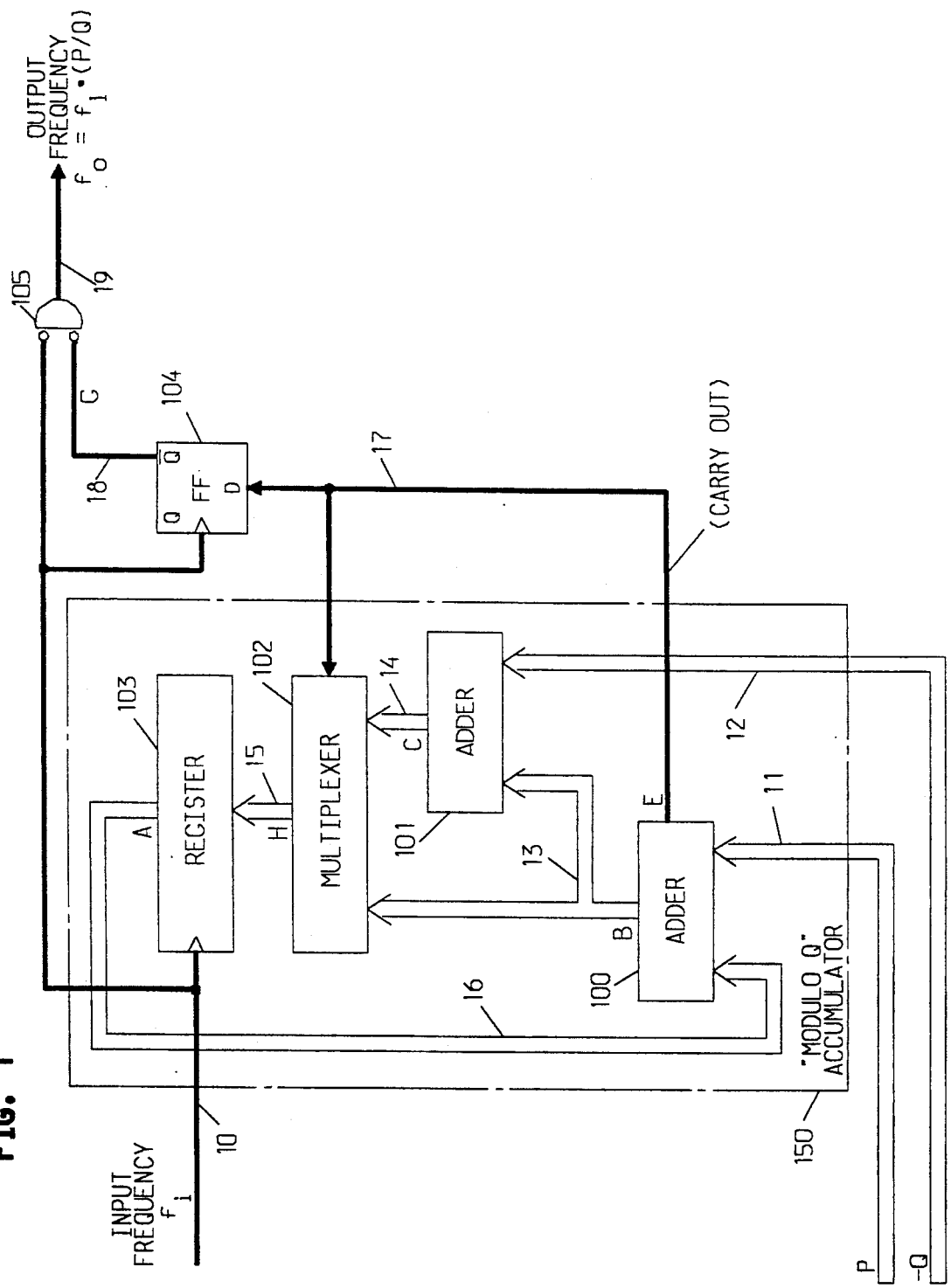
FIG. 1 is a detailed block diagram of an illustrative rational rate generator circuit embodying the principles of the invention.

An illustrative embodiment of the invention is a rational rate generator circuit which is shown in FIG. 1. Since the circuit of FIG. 1 is digital in nature, it will be convenient to view the operation of the circuit as passing through various states which are represented by the values of certain signals in a particular input clock cycle. As such, the timing diagram of FIG. 2 will additionally be utilized to clarify the operation of the circuit. In the timing diagram of FIG. 2, it should be observed that the operation of the circuit of FIG. 1 can be divided into a start-up phase and a steady-state phase. For completeness, both phases of circuit operation will be described; however, the concepts of circuit operation are identical in either phase.

In addition, because the circuit operation will involve both arithmetic and logic operations, all arithmetic values of signals will be represented by their base 10 equivalents. Also, where a number is to be subtracted from another number, the two's complement of the second number will be presented as a positive value and added to the first number. Finally, the binary logic level or "bit value" of a signal will be described as being either "zero" or "one".

Figure 2:
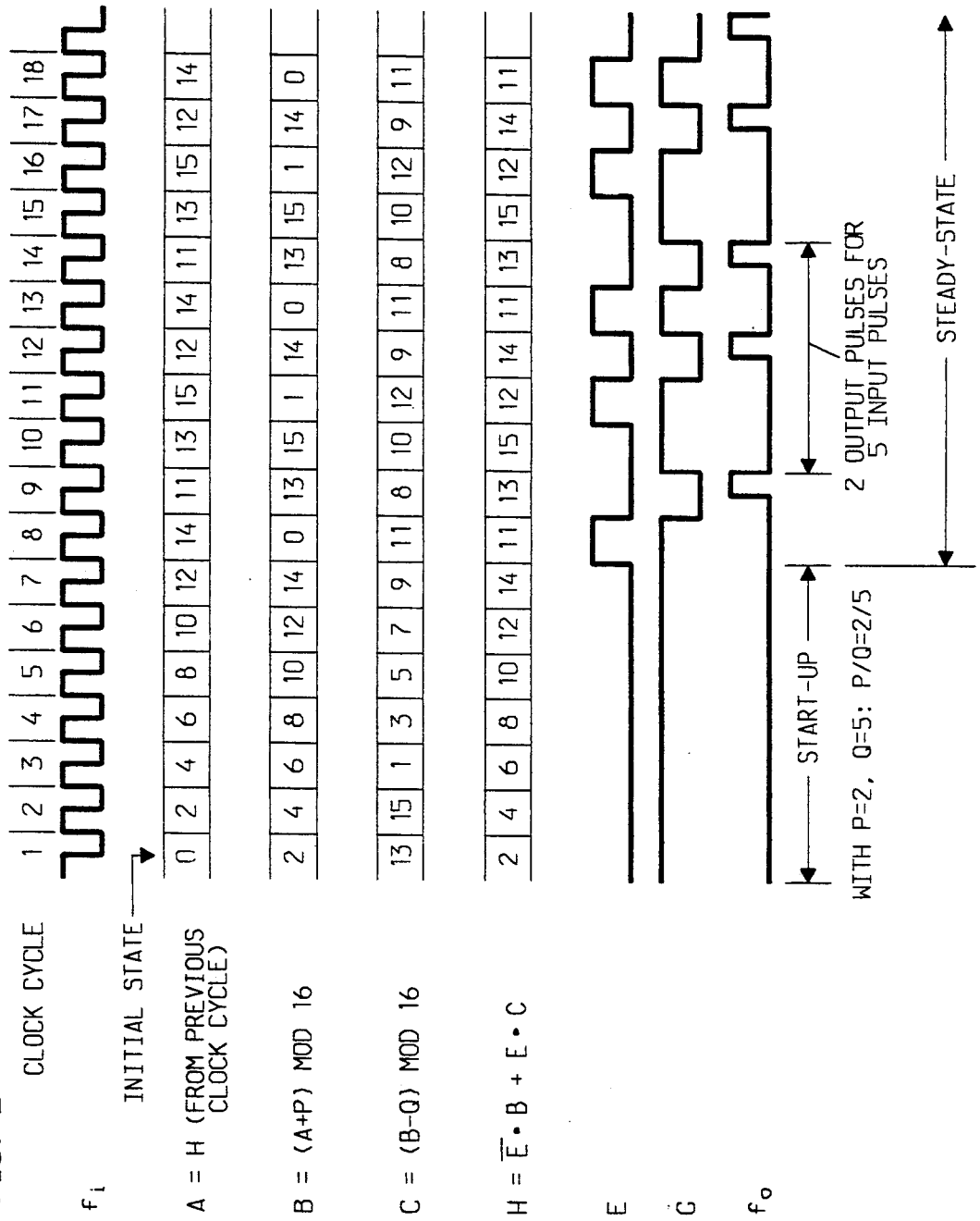
FIG. 2 shows a timing diagram for the operation of the circuit of FIG. 1.

For illustrative purposes it will be assumed that the circuit of FIG. 1 utilizes an input signal frequency represented by $f_i$, on lead 10, as shown in FIG. 2, and that P=2 and $-Q=11$ (i.e., the two's complement of Q=5). In other words, the desired output signal frequency is: $f_o=f_i(2/5)$.

Also, it is assumed in FIG. 1 that each one of multiconductor buses 11–16 (for the purposes of this illustration) is a four-bit bus (i.e., the value or state of the binary signals on the bus can be represented by a four-bit binary number herein represented by its decimal integer equivalent) and that their respective values are represented by the data symbols P, −Q, B, C, H, and A. Additionally, the components utilized are representative of typical off-the-shelf integrated circuits such as the: 74283 adder, 74157 multiplexer, and 74175 register. Specifically, adder 100 is a four-bit adder which will provide a carry out, or overflow, signal E when the sum of its inputs is greater than decimal 15 (i.e., it performs modulo 16 arithmetic), multiplexer 102 will switch its output between buses 13 and 14 depending on the value of signal E on lead 17, and register 103 will clock in the output of bus 15 on the rising edge of input signal $f_i$.

To additionally help in the understanding of the circuit, the following arithmetic equations can be constructed from FIG. 1:

$B=(A+P)$ modulo 16

$C=(B-Q)$ modulo $16=(A+P-Q)$ modulo 16

Furthermore, the following logic equations can be constructed:

$A=H$ (value of H from the previous clock cycle)

$H=\bar{E}B+EC$ (where "+" represents the logical "or" function)

Though circuit operation will be described more fully hereinbelow, it can be observed from FIG. 1 that the operation of the circuit can be modeled as being built around register 103 and adder 100 which, taken together (ignoring for the moment circuit components 101, 102, 104 and 105), form an accumulator. That is, at the beginning of every input clock cycle, register 103 stores the current value produced by adder 100 and then adder 100 adds that value back to P, or accumulates the number P modulo 16. The presence of circuit components 101 and 102 in the circuit, as indicated in FIG. 1, serves to modify this accumulator function by subtracting Q from the sum when adder 100 overflows. As labeled in FIG. 1, this effectively constructs "modulo Q" accumulator 150.

During the start-up phase, the circuit is assumed to begin, during the first clock cycle of signal $f_i$, with A being equal to 0 and the signal on lead 18, G, being equal to "one". From the above equations, the remaining signals are determined by these initial conditions during this first clock cycle. Specifically, it should be noted that the carry output signal E of adder 100 is equal to "zero". This is due to the sum, B, being equal to A+P (value of bus 11), which in this initial state is: 2+0=2 (i.e., there is no carry out). Since signal E, on lead 17, is equal to "zero", multiplexer 102 passes the input B through to the output H. H is the input to register 103 which will be clocked in at the beginning of the next clock cycle by signal $f_i$ on lead 10. Also, the value of the bit on lead 17, which is connected to the D input of flip-flop 104, will be clocked into the D input on the next clock cycle by signal $f_i$ via lead 10. Finally, the output signal $f_o$ on lead 19, of logic element 105, is initially "zero" due to the input signal G, on lead 18, being initially equal to "one".

On the second clock cycle, the value of H=2, from the first clock cycle, is now loaded into register 103. Additionally, the value of signal E, which is "zero", from the first clock cycle is also clocked into flip-flop 104. This results in the signal on lead 18 remaining at "one" and blocking any clock pulses from passing through logic element 105. When the new value of H is loaded into register 103, the output A will change to the new value, that is A=2. As a result, the value of B, being made equal to A+P by adder 100, will now change to be equal to 4. Since 4 still does not result in a carry out condition, the value of signal E during this second clock cycle will remain at "zero". The new value of B=4 will pass through multiplexer 102 to be clocked into register 103 on the beginning of the third clock cycle.

It can be observed from the timing diagram of FIG. 2 that the above sequence of events—that is, register 103 accumulating the sum of P—will continue for the third, fourth, fifth, sixth, and seventh clock cycles since the value of signal E remains at "zero" (i.e., no overflow). As indicated in FIG. 2, this period of time is referred to as the start-up phase for the circuit.

Steady-state circuit operation begins at the start of the eighth clock period when H=B=14 is clocked into register 103, and the value of signal E, which is "zero", is clocked into flip-flop 104. During this clock period, no output pulse on lead 19 is allowed due to signal G, on lead 18, still being equal to "one". However, since now A=14 and P=2, adder 100 will produce the output B=0 with an overflow, or the carry-out signal E becoming "one". At this point, E being equal to "one" will cause multiplexer 102 to switch the output H, from input B, to represent input C from adder 101, which is equal to $B-Q=A+P-Q=11$.

At the start of the ninth clock period, H=C=11 is clocked into register 103 (i.e., A=11), and E, which is equal to "one", is clocked into flip-flop 104 which causes signal G to equal "zero". Since signal G is equal to "zero", an inverted clock pulse, from the input clock signal $f_i$, appears on output lead 19. At the input to adder 100, A=11 and P=2, which results in an output of B=13, with the carry out signal E being equal to "zero". Since signal E equals "zero" during this clock period, multiplexer 102 will provide input B=13 to the output H.

At the start of the tenth clock period, H=B=13 is clocked into register 103 (i.e., A=13), and E, which is equal to "zero", is clocked into flip-flop 104 which causes signal G, on lead 18, to equal "one" and block any clock pulse from appearing on output lead 19. At the input to adder 100, A=13 and P=2 will produce the output B=15 with the carry-out signal E being equal to "zero". Since E equals "zero", multiplexer 102 will provide the input B to the output H.

At the start of the eleventh clock period, H=B=15 is clocked into register 103 (i.e., A=15), and E, which is equal to "zero", is clocked into flip-flop 104 which causes signal G, on lead 18, to equal "one" and block any clock pulse from appearing on output lead 19. At the input to adder 100, A=15 and P=2 will produce the output B=1 with the carry-out signal E being equal to "one". Adder 101, with inputs of B=1 and −Q=11 will produce C=12. During this clock period, due to carry-out signal E being equal to "one", multiplexer 102 will switch output H from input B to input C=12.

At the start of the twelfth clock period, H=C=12 is clocked into register 103 (i.e., A=12), and E, which is equal to "one", is clocked into flip-flop 104. Now, since signal G is equal to "zero", a second inverted clock pulse appears on output lead 19. At the input to adder 100, A=12 and P=2 will produce the output B=14 with the carry-out signal E being to "zero". At this point, since now E equals "zero", multiplexer 102 will switch input B to output H.

It will be noted that at the start of the thirteenth clock period, a value of H=B=14 is clocked into register 103, which is the same value as was clocked in during the eighth clock period. At this point, the circuit operation begins to repeat, with the thirteenth clock period being the same as the eighth. During the five clock periods extending from the eighth through the twelfth, it can be seen from FIG. 2 that two output pulses were produced, on output lead 19, for the five input pulses, i.e., $f_o = f_i(2/5)$. It should be noted, in this example, that the output pulses are not regularly spaced. The time interval between output pulses is illustrated by observing the value of B, in FIG. 2, during the input clock cycles and counting the number of intervening clock cycles between those successive representative values of B which indicate that counter 100 has overflowed. For example, in clock cycle eleven, B=1, and two clock cycles later B=0, which results in a spacing between output pulses of two input clock cycles. However, the next clock cycle when adder 100 overflows occurs in clock cycle sixteen, three input clock cycles later. As a result, $f_o = f_i(2/5)$ is the effective average output signal frequency. It should be noted, that this variable spacing between output pulses is limited to one input clock pulse, i.e. the number of input clock cycles between any two successive output pulses will not vary by more than one.

From the above description, it is observed that when the adder 100 overflows (i.e., signal E is equal to "one" on lead 17), Q is then subtracted from the sum and a pulse is output. Thus, it can be seen that a rational rate generator has been constructed which can produce any rationally related signal frequency $f_i(P/Q)$, where P<Q; so that, for every Q input pulses, P output pulses result.

Further, as seen in the illustrative embodiment of FIG. 1, since there is no down counter in the circuit, the circuit design is not dependent on first dividing the input clock by a power-of-two. In addition, the values of P and Q can easily be changed to provide a wide range of frequencies from a given input frequency. For example, buses 11 and 12 in FIG. 1 can actually be connected to the output of another logic means (e.g., a register), the value of which can be changed by a microprocessor. Finally, the frequency resolution of the output signal is determined by the values of P and Q and can easily be increased by the use of additional logic elements. For instance, P and Q can be increased in size to eight bits (i.e., to allow values of 0 to 255) by increasing the size of the multi-conductor buses, cascading adders, adding a multiplexer, and using an eight-bit register.

Figure 3:
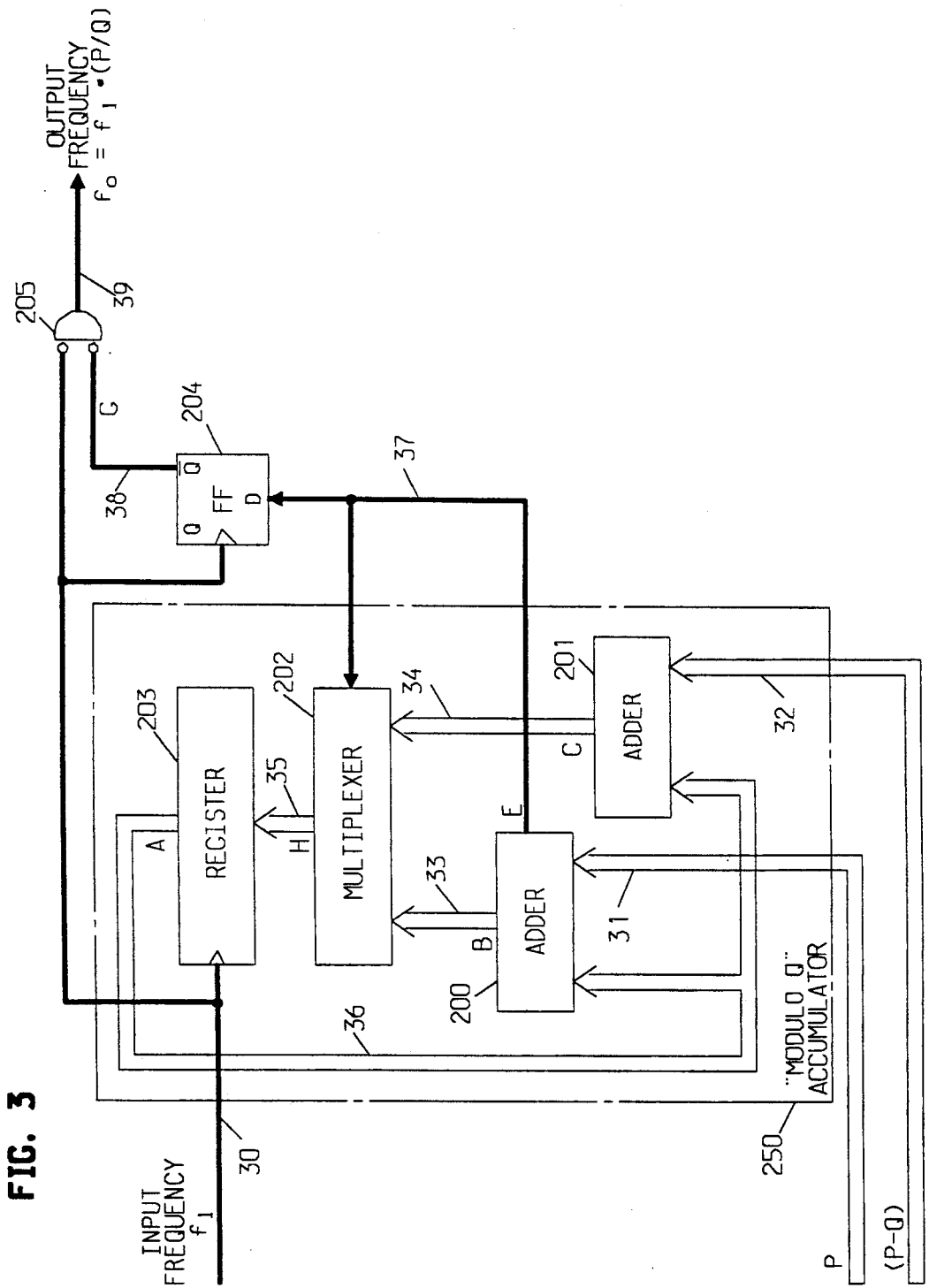
FIG. 3 is a detailed block diagram illustrating another rational rate generator circuit embodying the principles of the invention.

An additional illustrative embodiment of the invention is also shown in FIG. 3 which is equivalent to the embodiment of FIG. 1 (i.e., the same arithmetic and logic equations of FIG. 1 can be constructed). As a result, this embodiment will not be discussed further.

Figure 4:
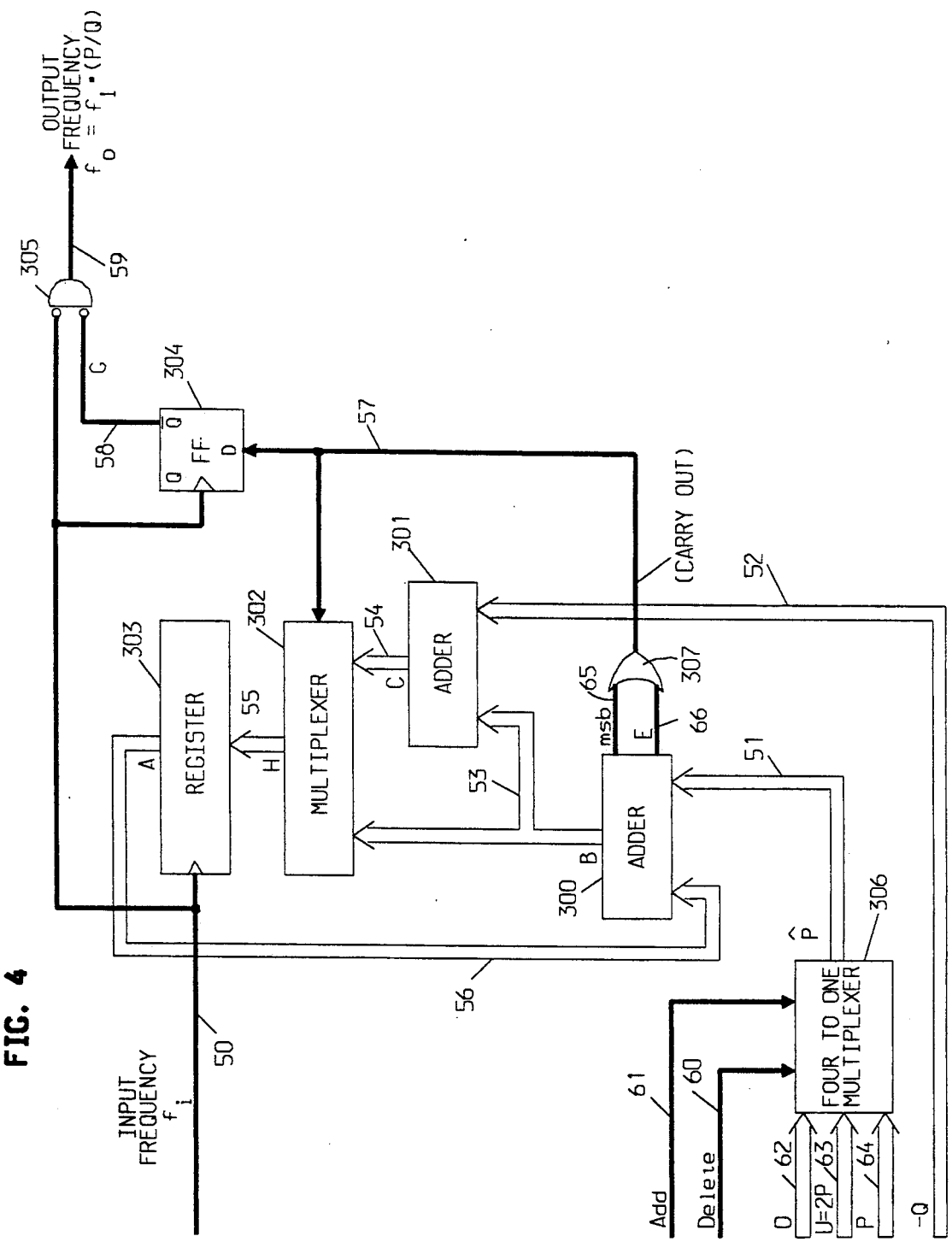
FIG. 4 is a detailed block diagram depicting the Add/Delete feature of another illustrative rational rate generator circuit embodying the principles of the invention.

Though the above rational rate multiplier can generate signals over a wide range of frequencies, occasionally it is required (e.g., in modems) to lock the output signal frequency, $f_o$, to an external reference frequency. As such, it may be desirable to have a way to vary the phase of the output signal frequency in order to better track a reference signal frequency. FIG. 4 shows an embodiment of the invention incorporating this feature. In FIG. 4, the interval between output pulses can be adjusted by adding or deleting time intervals, or what is known as providing phase updates, which are equal to the period of the input clock frequency. The circuit in FIG. 4 is basically the same as the circuit in FIG. 1 except for the addition of four-to-one multiplexer 306 and logic element 307. Besides the input signal frequency, $f_i$ on lead 50, the other data inputs illustratively are: P=2 on bus 64, U=2P on bus 63, 0 on bus 62, and −Q=11 on bus 52 (i.e., $f_o = f_i 2/5$). Multiplexer 306 receives inputs 0, U, and P and has two control signals, Delete and Add, on leads 60 and 61. It should be noted that due to the value of U=2P on bus 63, it is assumed that all the multi-conductor buses and circuit component inputs are wide enough to accommodate the data inputs with the only constraint being P<Q. For example, in this illustrative circuit which is an extension of FIG. 1, P is represented by the value of the four bits on bus 64. However, input U on bus 63 can be any value and in this example is illustratively equal to 2P which may require bus 63 to be comprised of five bits. Consequently, bus 51 is five bits wide which will result in adder 300 supporting modulo 32 arithmetic. Since, illustratively, the circuit (as in FIG. 1) is accumulating P modulo 16, bus 53 is four bits wide and logic element 307 monitors the most significant bit (msb) output and the carry out of adder 300 to determine when the result is greater than decimal 15 (i.e., due to the range of possible U+P values, a carry-out condition exists when either the result is greater than 15 but less than 32, or greater than 31). The output from multiplexer 306 is bus 51, also denoted as $\hat{P}$, which provides the input to adder 300. Depending on the state of the Add and Delete leads, a particular input to multiplexer 306 is switched to the output $\hat{P}$ as listed in table "one".

| Delete | Add | Input Selected |
|---|---|---|
| zero | zero | P |
| zero | one | U = 2P |
| one | zero | O |
| one | one | P |

(Note: Though, as defined here, both Add="one" and Delete="one" would not normally happen, it is good design practice to define all possible states.)

Assuming an initial state where input P is selected (i.e., Add is equal to "zero" and Delete is equal to "zero"), the output of multiplexer 306 will be equal to $\hat{P}=P=2$, which results in the same circuit operation as described in FIG. 1, and illustrated in the timing diagram of FIG. 2. For clarity, FIG. 5 represents a portion of the timing diagram of the circuit operation beginning with the eighth clock period, which, assuming $\hat{P}=P$, is identical to that portion of the timing diagram of FIG. 2. However, assume during clock cycle ten lead 61 becomes equal to "one" (i.e., Add is equal to "one" and Delete is equal to "zero"), input U=2P will now be switched to the output of multiplexer 306, i.e., $\hat{P}=2P=4$. As a result, on the next input clock cycle the value loaded into register 303 will be A+2+2 (as opposed to A+2). Comparing the resulting eleventh clock cycle of FIG. 2 and FIG. 5, it will be noted that the output value of the register, A, is now different. Specifically, the eleventh clock cycle of FIG. 5 is equal to the twelfth clock cycle of FIG. 2, or the entire counting sequence in FIG. 5 has been shorted by "one" when compared to FIG. 2. This causes the accumulator circuitry to reach the overflow condition a clock cycle sooner (i.e., an input clock pulse was effectively added), thus reducing the interval to the next output clock pulse. Similarly, as shown in FIG. 6, if during clock cycle eight, lead 60 now became equal to "one" (i.e., Add is equal to "zero" and Delete is equal to "one"), the input of 0 will now be switched to the output of multiplexer 306, i.e., $\hat{P}=0$. As a result, on the eleventh clock cycle the value loaded into register 303 will be A—that is, the value of register 303 does not change. If the value of register 303 does not change, the accumulator will not advance to the overflow condition for this clock period (i.e., an input clock pulse was effectively deleted), which increases the time between output clock pulses on lead 59, as can be seen in comparing the output clock pulses between FIG. 2 and FIG. 6.

Figure 7:
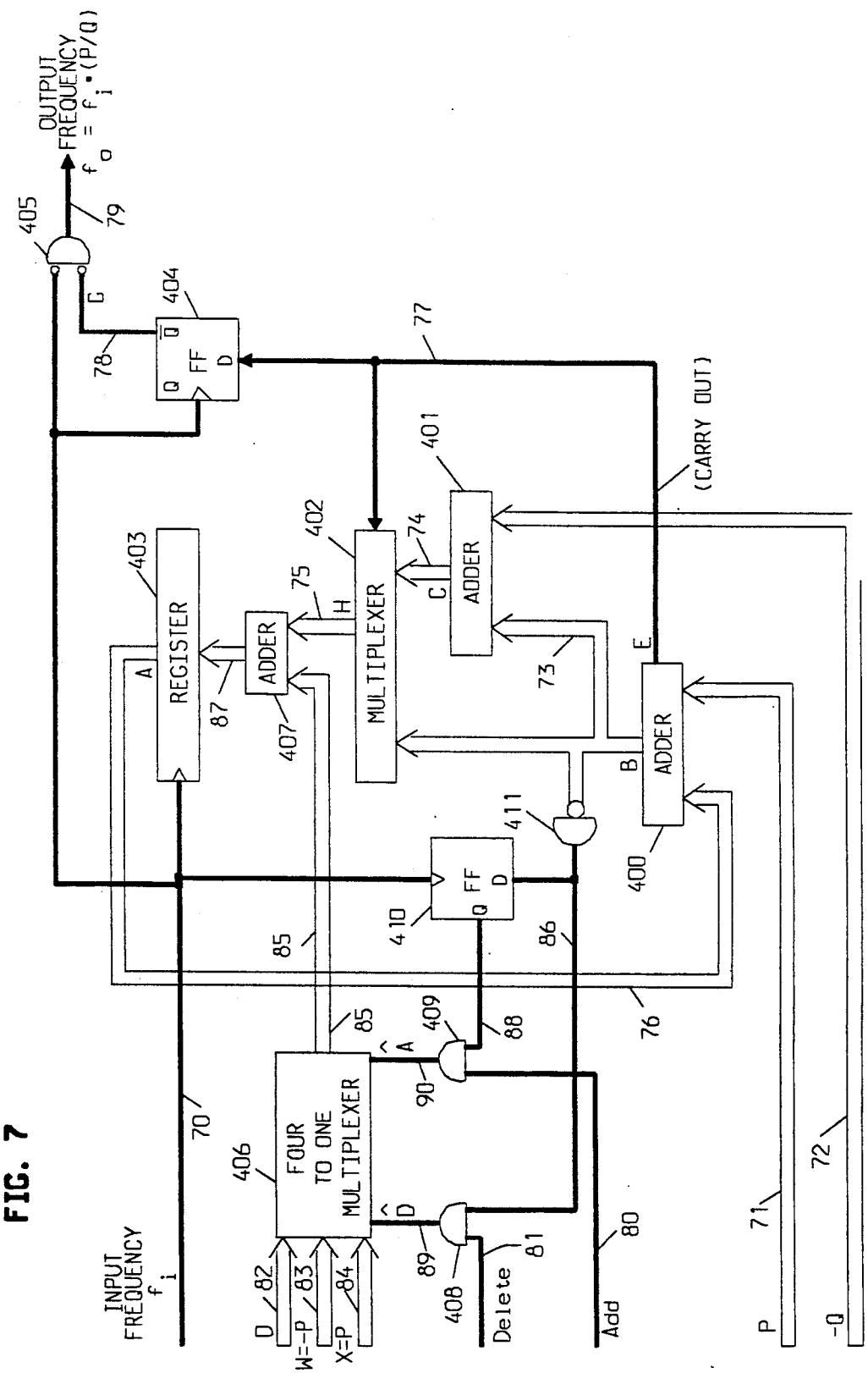
FIG. 7 is a detailed block diagram depicting the Add/Delete feature with optimum phase updates of another illustrative rational rate generator circuit embodying the principles of the invention.

The embodiment of FIG. 4 allows the accumulator value to be adjusted during any input clock period with the result that the time interval between successive output pulses can vary widely. However, in certain circumstances this could result in reducing the time interval between output pulses so as to exceed the effective frequency range of supporting circuitry (i.e., the instantaneous frequency in looking at the time interval between successive output clock pulses) or, in increasing the time interval between output pulses that could, for example, effect any derivative sampling rates. Therefore, an alternative circuit is shown in FIG. 7 which allows for optimum phase updates so that the actual output pulses are more uniformly distributed over a given time interval so that, as in the illustrative circuit of FIG. 1, the variable spacing between successive output pulses is limited to one input clock pulse, i.e. the number of input clock cycles between any two successive output pulses will not vary by more than one.

FIG. 7 is again built around the circuit of FIG. 1 with the addition of multiplexer 406, adder 407 and logic elements 408, 409, 410, and 411. Multiplexer 406 has multi-conductor bus inputs 82, 83, and 84 and control inputs on leads 89 and 90. Bus 82 receives the input of "zero", bus 83 the data input of W= −P, and bus 84 the data input of X=P. The control inputs are the result of outputs $\hat{A}$, from logic element 409 which qualifies the Add input on lead 80, and $\hat{D}$, from logic element 408 which qualifies the Delete input on lead 81. The output of multiplexer 406 is determined from the inputs as follows:

| $\hat{A}$ | $\hat{D}$ | Input Selected |
|---|---|---|
| zero | zero | O |
| zero | one | W = −P |
| one | zero | X = P |
| one | one | O |

Assuming the initial conditions of Add equal to "zero", Delete equal to "zero", X=P=2, W=−P=14 and Q=5, the circuit assumes the same operation as that of FIG. 1 since $\hat{A}$ and $\hat{D}$ both equal "zero". Specifically, the output of multiplexer 406 will be 0, which is the input to adder 407. Adder 407 has, as the other input, the output H of multiplexer 402. As a result, the output of adder 407 will only reflect the output H of multiplexer 402 (i.e., H+0=H), which provides the same input to register 403 as in FIG. 1, and therefore results in the same circuit operation. However, when it is desired to increase the time interval between output pulses, then Add is equal to "zero" and Delete is equal to "one". Since the $\hat{D}$ control signal to multiplexer 406 is gated by logic element 408, there is no change initially to the output of multiplexer 406 until logic element 411 provides a "one" input on lead 86. Logic element 411 is a multiple input NOR gate, which will provide a "one" output when all of the inputs on lead 73 equal 0, which is the output, B, of adder 400, i.e. any phase updates are synchronized to the circuit operation. As mentioned above, in the description of the illustrative circuit of FIG. 1 a fractional output frequency is generated where the number of input pulses that occur between successive output pulses will either be $N_1$ or $N_2$, and $N_2=N_1+1$. When B=0, two conditions have occurred: a) the number of input clock pulses prior to B=0, from the previous output clock pulse, are at their minimum (i.e. $N_1$); and b) subsequent to B=0, no output pulse can ever occur on the following clock cycle (since P<Q), so that the number of input clock pulses to the next output pulse are at their maximum (i.e. $N_2$). As a result, any phase updates to effectively delete an input clock pulse, synchronized to B=0, will only add one clock pulse to the minimum number, i.e. $N_1+1$, which is $N_2$. Similarly, when Add is equal to "one" and Delete is equal to "zero", flip-flop 410 is used to delay by one clock pulse the synchronization, so that any phase updates to effectively add an input clock pulse will only delete one clock pulse from the maximum, $N_2-1$, which is $N_1$. As a result, the circuit of FIG. 7 will maintain the variable spacing between successive output pulses to one input clock pulse, i.e. the number of input clock cycles between any two successive output pulses will not vary by more than one. Since the illustrative circuit of FIG. 7 requires that the condition of B=0 be satisfied before any phase update occurs, it should be noted that to ensure that the condition of B=0 will occur, the values of P and Q should have no common factors.

The present invention of providing a fractional output frequency for a given input frequency, where $f_o = f_i(P/Q)$, has been described in terms of an illustrative circuit embodiment to illustrate the principles of the invention. It should be realized that the invention is not limited to this particular embodiment and that additional embodiments, modifications and applications which will become obvious to those skilled in the art are included in the spirit and the scope of the invention.

We claim:

1. A rational rate generator circuit comprising:

logic means comprising means for receiving Add and Delete input signals and input data representative of integers U and P, and for providing an output quantity representative of the integer P when the Add input is equal to zero and the Delete input is equal to zero, and for providing an output quantity representative of the integer U when the Add input is equal to one and the Delete input is equal to zero, and for providing an output quantity representative of the integer zero when the Delete input is equal to one and the Add input is equal to zero;

an accumulator comprising means for receiving input data representative of integer Q, an input clock signal $f_i$, and the output of the logic means, to accumulate the sum of the output of the logic means, modulo $2^M$, for every input clock cycle in which the sum does not overflow and for subtracting Q when the sum overflows and for providing an overflow signal, where M is an integer, and $P<Q$ and $Q<2^M$; and output means responsive to the overflow signal of the accumulator to output a clock pulse when the sum overflows.

2. A rational rate generator circuit comprising:

means for input comprising means for receiving an input clock signal $f_i$, and input data representative of integers P,Q,X, and W, where $P<Q$;

a register with a data input, a data output and a clock input for receiving the input clock signal $f_i$;

first adding means responsive to input data representative of the integer P and the register output for providing their sum, modulo $2^M$, and for providing an overflow signal when that sum is greater than $2^M - 1$, where M is an integer and $Q<2^M$;

second means for providing a quantity representative of the difference, modulo $2^M$, of the sum provided by the first adding means and the input data representative of the integer Q;

multiplexing means for providing the output of the first adding means when there is no overflow and for providing the output of the second adding means when there is an overflow;

means for output responsive to the overflow signal of the first adding means for providing an output clock pulse when the sum overflows;

logic means comprising means for receiving input signals Add and Delete, and means responsive to Add, Delete, $f_i$, and input data representative of the integers X and W, and the output of the first adding means, for providing an output quantity representative of the integer zero when the Add input is equal to zero and the Delete input is equal to zero or the sum of the first adding means is not equal to zero, and for providing an output quantity representative of the integer X an input clock cycle after the sum of the first adding means equals zero when the Add input is equal to one and the Delete input is equal to zero and the sum of the first adding means is equal to zero, and for providing an output quantity representative of the integer W when the Delete input is equal to one and the Add input is equal to zero and the sum of the first adding means is equal to zero; and third adding means responsive to the output of the logic means and the output of the multiplexing means to provide their sum, modulo $2^M$, to the register input.

* * * * *